United States Patent [19]
Kimura et al.

[11] Patent Number: 5,749,710
[45] Date of Patent: May 12, 1998

[54] REFRIGERANT COMPRESSOR WITH ROTATION DETECTING MEANS

[75] Inventors: Kazuya Kimura; Yoshihiro Makino, both of Kariya, Japan

[73] Assignee: Kabushiki Kaisha Toyoda Jidoshokki Seisakusho, Kariya, Japan

[21] Appl. No.: 651,774

[22] Filed: May 22, 1996

[30] Foreign Application Priority Data

May 26, 1995 [JP] Japan ............... 7-128665

[51] Int. Cl.$^6$ ............................... F04B 49/02
[52] U.S. Cl. ............................... 417/63; 417/223
[58] Field of Search ............... 417/63, 212, 222.2, 417/223; 324/207.13, 207.22, 207.24, 207.26

[56] References Cited

U.S. PATENT DOCUMENTS

| | | | |
|---|---|---|---|
| 4,704,072 | 11/1987 | Nakajima et al. | 417/223 |
| 4,781,538 | 11/1988 | Daikohara | 417/223 |
| 5,407,328 | 4/1995 | Kimura et al. | 417/63 X |
| 5,540,560 | 7/1996 | Kimura et al. | 417/223 |
| 5,624,240 | 4/1997 | Kawaguchi et al. | 417/222.2 |

FOREIGN PATENT DOCUMENTS

| | | |
|---|---|---|
| 58-73991 | 5/1983 | Japan. |
| 60-178985 | 9/1985 | Japan. |
| 3-6878 | 2/1991 | Japan. |
| 6299960 | 10/1994 | Japan. |
| 6299961 | 10/1994 | Japan. |

*Primary Examiner*—Ismael Izaguirre
*Attorney, Agent, or Firm*—Burgess, Ryan & Wayne

[57] ABSTRACT

A refrigerant compressor having a drive shaft for driving a compressing mechanism and driven by a drive power transmitted from an external drive power source, and a rotation detecting unit for detecting the rotating speed of the compressor by detecting a change in the magnetic flux leaking from the solenoid clutch and circulating through a predetermined magnetic circuit. The change in the magnetic flux is caused by rotation of a magnetic plate-like element having at least one cutout which moves past the magnetic detecting unit, and a permanent magnet fixedly held by the housing assembly of the compressor is arranged so as to increase the density of the magnetic flux circulating through the predetermined magnetic circuit whereby the change in the magnetic flux caused by the rotation of the magnetic plate-like element becomes rapid.

9 Claims, 5 Drawing Sheets

5,749,710

REFRIGERANT COMPRESSOR WITH ROTATION DETECTING MEANS

BACKGROUND OF THE INVENTION

1. Field of the Invention

The present invention relates generally to a refrigerant compressor for a climate control system for automobile and, more particularly, to a refrigerant compressor provided with a drive shaft rotated by an automobile engine for operating a compressing mechanism and with a rotation detecting means for detecting the rotation of the drive shaft of the compressor.

2. Description of the Related Art

A fluid compressor, and especially a refrigerant compressor for a climate control system for an automobile is usually driven by an automobile engine via a drive power transmission means often including a solenoid clutch. The refrigerant compressor is provided with a body having a fluid-tight construction and a drive shaft for causing a compressing operation of a refrigerant compressing mechanism and, when the compressor fails due to a seizure or a liquid compression and is unable to rotate, the compressor must be immediately disconnected from the automobile engine by disconnecting the solenoid clutch of the drive power transmission means in order to protect the automobile engine and its associated equipment and elements. Namely, since the refrigerant compressor for the automobile climate control system and other auxiliary equipments of the automobile such as a water pump and an electric alternator are commonly driven by the automobile engine via a common drive power transmission means, the solenoid clutch of the transmission means provided between the engine and the compressor must be switched to OFF immediately when the compressor falls into a failure condition thereof, so as to prevent the auxiliary equipment of the automobile from being broken or damaged. Therefore, in order to detect the failure condition of the refrigerant compressor for the automobile climate control system, the refrigerant compressor is usually provided with a rotation detecting means for detecting a change in the rotation of the compressor. Thus, when the number of rotations per second of the compressor falls below a given set value, the solenoid clutch is made OFF to prevent transmission of the drive power from the automobile engine system to the compressor.

For example, Japanese Examined Utility Model Application Publication (Kokoku) No. 3-6878 discloses one typical rotation detecting means for a wobble-plate type refrigerant compressor in which a magnetic circuit is formed so as to permit magnetic flux leaking from a solenoid clutch to flow through a drive shaft of the compressor and the race of a bearing supporting the drive shaft, and a magnetic pick up, i.e., a detector, is attached to a part of the framework of the compressor so as to detect a change in the magnetic flux caused when a protrusion formed in the race of the bearing passes by the detector.

Japanese Unexamined Utility Model Application Publication (Kokai) No. 58-73991 discloses a slide vane type refrigerant compressor provided with a rotation detecting means in which a magnetic detector is arranged so as to detect a change in a magnetic flux flowing in a magnetic circuit extending from a solenoid clutch through a drive shaft, a rotor (vanes), and the iron core of the magnetic detector, and the magnetic detector is arranged so as to confront the end face of the rotor or the respective vanes to thereby detect the change in the magnetic flux during the rotation of the rotor or the vanes.

At this stage, in compressors having a fluid-tight construction therein, detection of rotation of the compressors must encounter various difficulties such as difficulty in deriving a signal from the compressor, indicating the number of rotation of the compressor, in obtaining a spacing permitting a rotation detector to be mounted on the compressor, and in obtaining a strong output signal, clearly indicating the rotation of the compressor, from the rotation detector.

Namely, (1) if the rotation detector is mounted on a compressor so as to pierce through the body of the compressor, provision of a fluid tight sealing construction for the rotation detector and for a surrounding portion of the rotation detector becomes difficult.

(2) If detection of the rotation of the compressor is carried out so as to detect either rotation of a portion of a rotating drive shaft of the compressor extending outward beyond the end of the body of the compressor or rotation of a pulley associated with the drive shaft of the compressor, obtaining mounting space for a rotation detector is very difficult.

(3) Further, if detection of the rotation of the compressor is carried out in such manner that a change in the magnetic flux passing through the body of the compressor is detected by a detector arranged at a position outside the compressor, the output signal derived from the rotation detector becomes weak.

Taking into account the above (1) through (3), the aforementioned conventional rotation detecting means of the refrigerant compressors are insufficient or defective from the economical point of view due to the necessity for fluid-tight construction for the rotation detector. In the rotation detector of Japanese Examined Utility Model Application Publication No. 3-6878, a large space left between the rotation detector and the solenoid clutch makes it difficult to form a closed magnetic circuit, and accordingly, the rotation detector must necessarily have a very small detecting sensitivity. Thus, accurate detection of the rotation of the compressor becomes difficult.

SUMMARY OF THE INVENTION

An object of the present invention is, therefore, to provide a rotation detecting means, for a refrigerant compressor, which is able to accurately detect a change in the magnetic flux leaking from a solenoid clutch arranged between a drive power transmitting means and a drive shaft of the compressor to precisely thereby detect a change in a rotation of the compressor with a high detection sensitivity. Another object of the present invention is to provide a rotation detecting means suitable for being incorporated in a refrigerant compressor for an automobile climate control system and driven by an automobile engine via a transmission means including a solenoid clutch mounted around an end of a drive shaft of the compressor.

In accordance with the present invention, there is provided a refrigerant compressor including a housing assembly formed by a plurality of framework members combined together, a mechanical combining means for mechanically combining the plurality of framework members in a fluid-tight condition, a drive shaft rotatably supported in the housing assembly and having a drive portion thereof within the housing assembly, and an axial extension outwardly extending from the housing assembly to receive a drive power from an external drive source via a solenoid clutch having a stator element containing electric coils, a compressing means mounted on the drive portion of the drive shaft within the housing assembly for performing a repetitive motion upon being driven by the drive shaft to compress a refrigerant gas, and a rotation detecting means, the rotation detecting means comprising in combination:

a magnetic circuit means for permitting magnetic flux leaking from the solenoid clutch to circulatively flow through the drive shaft, the compressing means, and the mechanical combining means;

a magnetic detecting means arranged in the magnetic circuit means in a region outside the housing means for detecting a change in the magnetic flux which occurs in response to the repetitive motion of the compressing means to thereby produce an output signal representing a rotating speed of the compressor; and a permanent magnet means arranged in one of the plurality of framework members at a position close to the magnetic detecting means and where the permanent magnet means confronts the compressing means, the permanent magnet means being arranged to generate an additional magnetic flux increasing the density of the magnetic flux flowing through the magnetic circuit means at a position close to the magnetic detecting means to thereby activate the detecting operation of the magnetic detecting means.

In a preferred embodiment, the mechanical combining means comprises a plurality of long bolts, each having a head at one end thereof and a threaded portion at the other end thereof, the threaded portion of each of the plurality of long bolts being threadedly engaged with one of the plurality of framework members to tighten the housing means between the head and the threaded portion. The head of one of the plurality of long bolts is provided for mounting therearound the magnetic detecting means.

Alternatively, in a further preferred embodiment, the magnetic detecting means may be attached to the stator element of the solenoid clutch.

The permanent magnet means housed in the housing means generates the additional magnetic flux which circulates through the compressing means and the mechanical combining means. Thus, the additional magnetic flux circulating through the magnetic circuit can increase the density of the magnetic flux leaking from the stator of the solenoid, so that the change in the magnetic flux caused by the repetitive motion of the compressing mechanism is increased so as to permit the magnetic detecting means arranged outside the housing assembly of the compressor to produce a large output signal accurately and precisely representing the rotating speed of the compressor. Accordingly, all irregular conditions occurring during the operation of the compressor can be immediately detected by the magnetic detecting means without error. Preferably, the compressing means may comprise a rotor element mounted on the drive portion of the drive shaft so as to be rotated together with the drive shaft. Then, the rotor element is provided with at least one intended cutout portion formed in a circumferential portion thereof to cause a sharp change in the magnetic flux in the magnetic circuit.

DESCRIPTION OF THE DRAWINGS

The above and other objects, features and advantages of the present invention will be made more apparent from the ensuing description of preferred embodiments thereof with reference to the accompanying drawings wherein.

DESCRIPTION OF PREFERRED EMBODIMENTS

Figure 1:
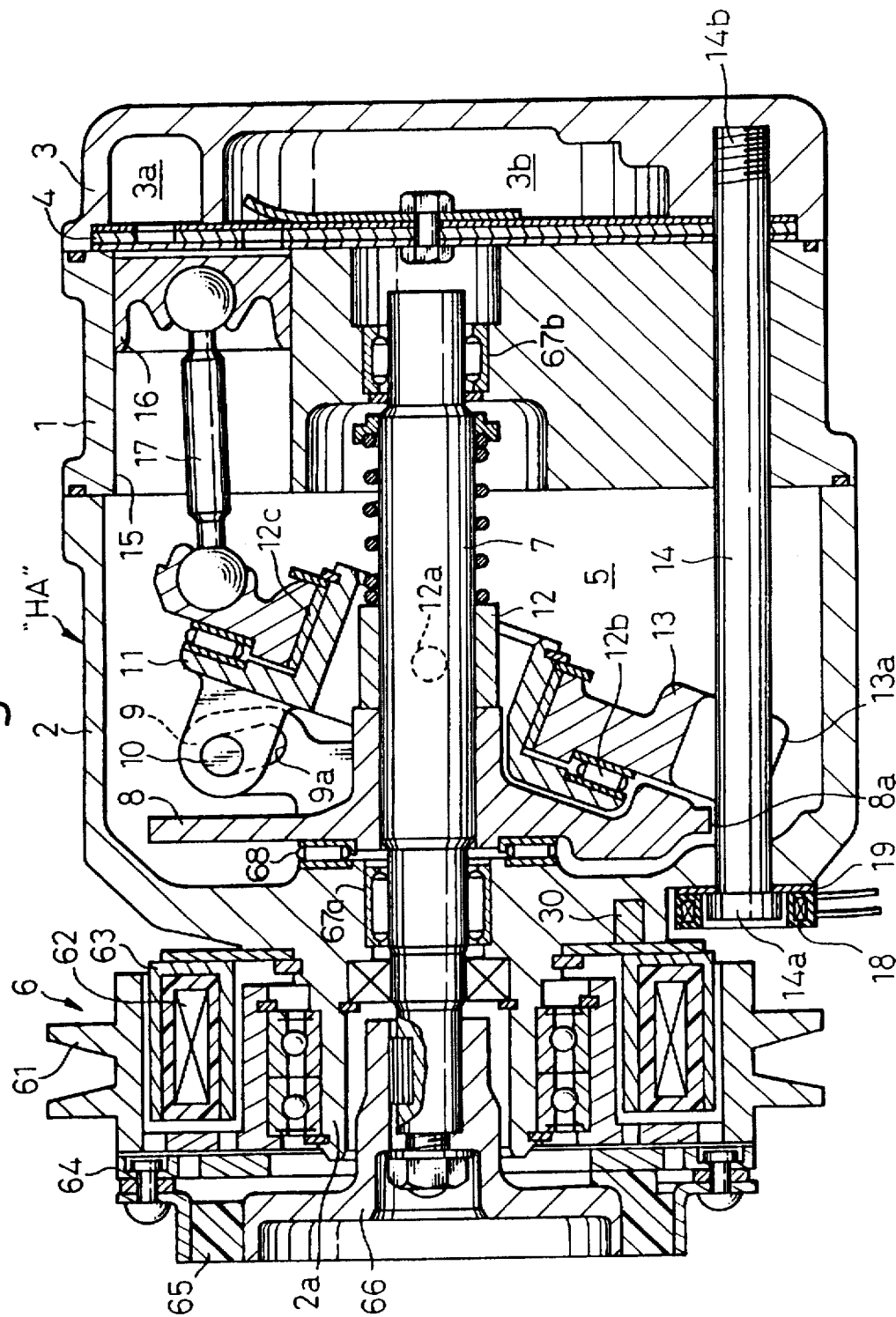
Fig. 1 is a longitudinal cross-sectional view of a refrigerant compressor provided with a rotation detecting means according to a first embodiment of the present invention.
Figure 3:
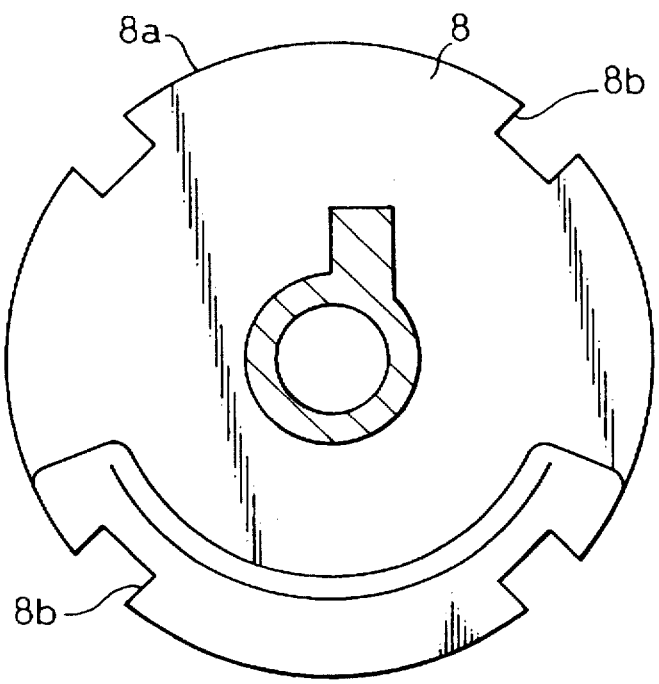
Fig. 3 is a side view, in part cross-section, of a rotor element of a compressing means which may be incorporated in the compressors of FIGS. 1 and 2.

Referring first to FIGS. 1 and 3, a refrigerant compressor in the form of a wobble plate type refrigerant compressor is provided with a housing assembly "HA" for receiving therein a later-described refrigerant compressing mechanism, a drive shaft 7 rotatably supported in the housing assembly "HA", and a solenoid clutch device 6 for transmitting a rotational drive power from an external drive power source, such as an automobile engine, to the drive shaft 7.

The housing assembly "HA" includes a cylinder block 1 having a front end closed by a front housing 2, and a rear end closed by a rear housing 3 via a valve plate 4. The cylinder block 1, and the front and rear housings 2 and 3 are separately made of non-magnetic alloy material to form individual framework members, but are axially and tightly combined together by later-described long bolts 14 arranged approximately equi-angularly about a central axis of the housing assembly "HA". The rear housing 3 in the form of an end cap has a suction chamber 3a for receiving a refrigerant gas before compression, and a discharge chamber 3b for the refrigerant gas after compression. The front housing 2 has a crank chamber 5 air-tightly defined therein, across which an axial drive shaft 7 extends so as to be rotatably supported by front and rear anti-friction radial bearings 67a and 67b fitted in the front housing 2 and the cylinder block 1. The drive shaft 7 has a front extension enclosed by a cylindrical boss 2a of the front housing 2, and connected to an automobile engine (not shown), i.e., an external drive power source via a solenoid clutch 6. The drive shaft 7 has an axial drive portion within the crank chamber 4, and a rotor element 8 is fixedly mounted on an end of the drive portion to be rotated together with the drive shaft 7, and supported by a thrust bearing 68 seated on an inner face of the front housing 2.

The rotor element 8 has a rear extension 9 formed as a support arm having an elongated through-hole 9a in which a guide pin 10 is slidably fitted. The guide pin 10 is connected to a rotatable swash plate 11 which is able to change its angle of inclination with respect to a plane perpendicular to an axis of rotation of the drive shaft 7.

On the drive portion of the drive shaft 7 is slidably mounted a sleeve element 12 adjoining an end of the boss of the rotor element 8. The sleeve element 12 has a pair of lateral trunnion pins 12a, 12a engaged in corresponding receiving bores (not shown) of the swash plate 11. Thus, the swash plate 11 can perform a pivotal motion about the pair of trunnion pins 11 to change the angle of inclination thereof. The swash plate 11 has a support thereof on which a wobble plate 13 is supported via an anti-friction bearing 12b and a slide bearing 12c, so that the wobble plate 13 does not rotate together with the swash plate 11. The wobble plate 13 having a generally circular shape is provided with a peripheral portion thereof in which a recessed guide way portion 13a is formed so as to permit one of the long bolts 14 to extend and prevent the wobble plate 13 from being rotated.

The wobble plate 13 is operatively connected, via connecting rods 17, to a plurality of pistons 16 slidably received in axial cylinder bores 15 of the cylinder block 1 which are arranged around and in parallel with the axis of rotation of the drive shaft 7. Thus, the rotation of the drive shaft 7 causes a nutating motion of the wobble plate 13 via the rotor element 8 and the rotatable swash plate 11. The nutating motion of the wobble plate 13 causes reciprocation of respective pistons 16 within corresponding cylinder bores 15, and accordingly, the respective pistons 16 reciprocating within the cylinder bores 15 perform suction of the refrigerant gas from the suction chamber 3a into the respective cylinder bores 15, compression of the sucked refrigerant gas, and discharge of the compressed refrigerant gas. Thus, it will be understood that a compression mechanism of the compressor is constructed by an assembly of the rotor element 8, the swash plate 11, the wobble plate 13, the connecting rods 17, and the pistons 16.

The solenoid clutch 6 is rotatably mounted around the boss 2a of the front housing 2 via a radial bearing element, and includes a rotor (pulley) 61 operatively connected to the automobile engine via a belt member (not shown), a stator element 63 housed in an annular chamber formed in an inside portion of the rotor 61 and having a solenoid 62, an armature 64, and a hub element 66 fixed to the drive shaft 7 and acting to provide a mechanical connection between the armature 64 and the drive shaft 7 via a shock absorber member 65. The rotor 61 has an outer side face functioning as a frictional power transmitting face confronting the armature 64 via a small gap. Thus, the armature 64 comes into contact with the outer side face of the rotor 61 when the solenoid 62 of the stator 63 is electrically energized, and transmits drive power from the rotor 61 to the drive shaft 7. The armature 64 comes out of contact with one side face of the rotor 8 when the solenoid 62 is de-energized.

The drive shaft 7, the long bolts 14 (the mechanical combining means), and the rotor element 8 are made of strong magnetic material such as an iron system metallic material. The respective long bolts 14 have a head 14a at one end thereof and a threaded portion 14b at the opposite end thereof, respectively to provide the housing assembly "HA" with a mechanical combining force when tightened. The rotor element 8 is provided with an outer circumference 8a which is formed and mounted so as to pass by a portion of each of the long bolts 14 during the rotation of the rotor element 8 and the drive shaft 7. Namely, there remains a smallest possible gap between the outer circumference 8a of the rotor element 8 and the outer surface of each long bolt 14 as typically shown in FIG. 1. Thus, when magnetic flux leaks from the solenoid 62 of the solenoid clutch 6, it circulates through the drive shaft 7, the rotor element 8, and the long bolts 14. That is, the drive shaft 7, the rotor element 8, and the long bolts 14 provide a closed magnetic circuit in which a dense magnetic flux is formed.

At this stage, the outer circumference 8a of the rotor element 8 is provided with one or more later-described cutouts 8b formed therein so as to cause a change in the magnetic flux in the above-mentioned magnetic circuit during the rotation of the rotor element 8. In a preferred embodiment, four cutouts 8b are equiangularly arranged in the outer circumference 8a of the rotor element 8.

The head 14a of one of the long bolts 14 is enclosed by a magnetic detector (i.e., a pick-up coil) 18 which is attached to a washer member 19 to detect the above-mentioned change in the magnetic flux flowing through the magnetic circuit and to produce an output signal indicating a later-described rotating speed of the compressor, i.e., a rotating speed of the drive shaft 7.

Further, a permanent magnet 30 is embedded in a front face of the front housing 2 which is formed to be juxtaposed with the rotor element 8 rotating in the crank chamber 5. The permanent magnet 30 is further disposed at a position close to the above-mentioned magnetic detector 18 in a manner such that the permanent magnet 30 is able to produce an additional magnetic flux to be added to the magnetic flux leaking from the solenoid 62 of the stator 63 of the solenoid clutch 6. Namely, an increase in the magnitude of the magnetic flux circulating through the magnetic circuit is achieved by the provision of the permanent magnet 30.

In the present invention, the rotor element 8, one of the constituents of the compressing mechanism, rotating with the drive shaft 7 is very important member for forming a sharp change in the magnetic flux during the rotation of the compressor. Therefore, the rotor element 8 must be provided with distinct cutouts 8b.

Figure 4:
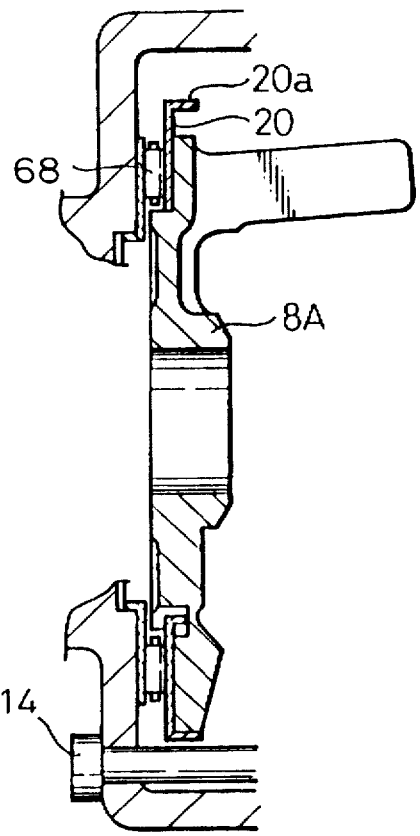
FIG. 4 is a cross-sectional view of a different rotor which may also be incorporated in the compressors of FIGS. 1 and 2.
Figure 5:
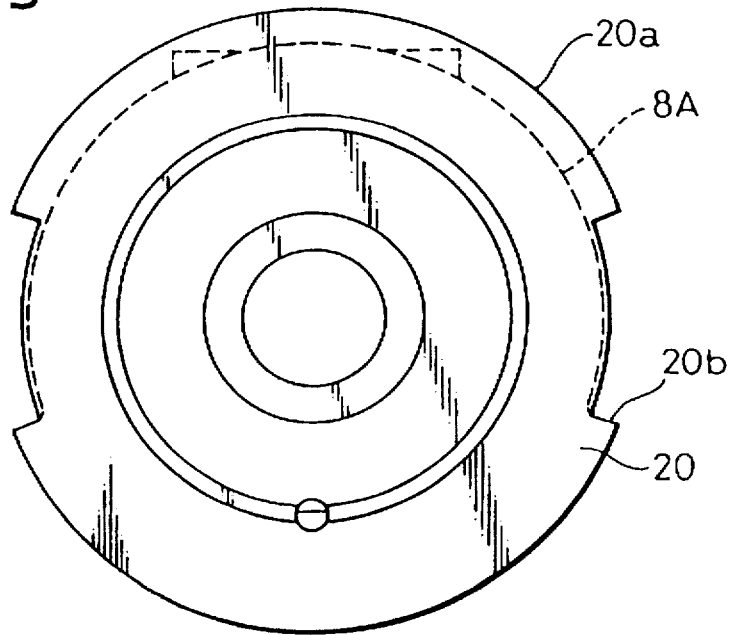
FIG. 5 is a side view of the rotor of FIG. 4.

Nevertheless, as shown in FIGS. 4 and 5, a different rotor element 8A which is not a round disc member having a circular outer circumference must be employed as one of the constituents of the compressing mechanism of the compressor because, since the rotor element 8A must rotate smoothly in the crank chamber 5 with a dynamically balanced condition during the rotation thereof, the rotor element 8A must be deformed from a round disc. As a result, the cutouts 8b cannot be formed in the rotor element 8A. At that stage, one of the races of the thrust bearing 68 supporting the rotor element 8A, i.e., the rotatable race 20 should be formed so as to have a flange portion 20a in which e.g., two diametrically spaced cutouts 20b should be formed in the flange portion 20a of the race 20. The diametrically spaced two cutouts 20b can provide a sharp change in the magnetic flux when the rotor element 8A rotates. It should be understood that the thrust bearing axially supporting the rotor element 8 is one of the constituents of the compressing mechanism of the refrigerant compressor.

Further, depending on how the housing assembly "HA" of the compressor and the solenoid clutch 6 are assembled together, the above-mentioned permanent magnet 30 for increasing the density of a magnetic flux may be attached to the stator of the solenoid clutch 6 instead of embedding the permanent magnet 30 in the front housing 2 as shown in FIG. 1.

In the described embodiment, when the solenoid clutch 6 is energized to provide a mechanical connection between the rotor 61 and the drive shaft 7 of the compressor, a drive power supplied from the external automobile engine is transmitted to the drive shaft 7 so as to rotationally drive the shaft 7. The rotation of the drive shaft 7 is converted into a nutating motion of the wobble plate 13 via the rotor element 8 and the swash plate 11. Thus, the respective pistons 16 operatively connected to the wobble plate 13 reciprocate in the cylinder bores 15, and compress the refrigerant gas.

The magnetic flux leaking from the solenoid clutch 6 constantly circulates through the magnetic circuit formed by the drive shaft 7, the rotor element 8, and the long bolt 14, in the form of a dense magnetic flux. Further, the magnetic flux generated by the permanent magnet 30 enters through the front face of the non-magnetic front housing 2 into the rotor element 8, and then, circulates through the long bolt 14, the magnetic detector 18, and the stator 63 of the solenoid clutch 6 while greatly increasing the density of the magnetic flux passing through the long bolt 14 provided with the magnetic detector 18.

Therefore, during the rotation of the rotor element 8, when each of the cutouts 8b of the outer circumference 8a of the rotor element 8 moves past the long bolt 14 having the magnetic detector 18, there occurs a cyclic and sharp change in the magnetic flux flowing through the long bolt 14. Therefore, the magnetic detector 18 detects the change in the magnetic flux, and produces a corresponding output signal in the form of a pulsed voltage signal. The output signal of the magnetic detector 18 is supplied to the conventional processing means in which the output signal is processed to obtain an accurate signal indicating the rotating speed of the compressor, i.e., the rotating speed of the drive shaft 7.

Since the output signal of the magnetic detector 18 constantly represents the instant state of the rotating speed of the compressor, if the number of the electric pulsed voltage signals as per a unit time falls extremely or to zero, due to an occurrence of an irregular or abnormal condition of the compressor, a separate signal is issued from a separate control unit (not shown) to disengage the compressor from the automobile engine by de-energizing the solenoid clutch 6.

Figure 2:
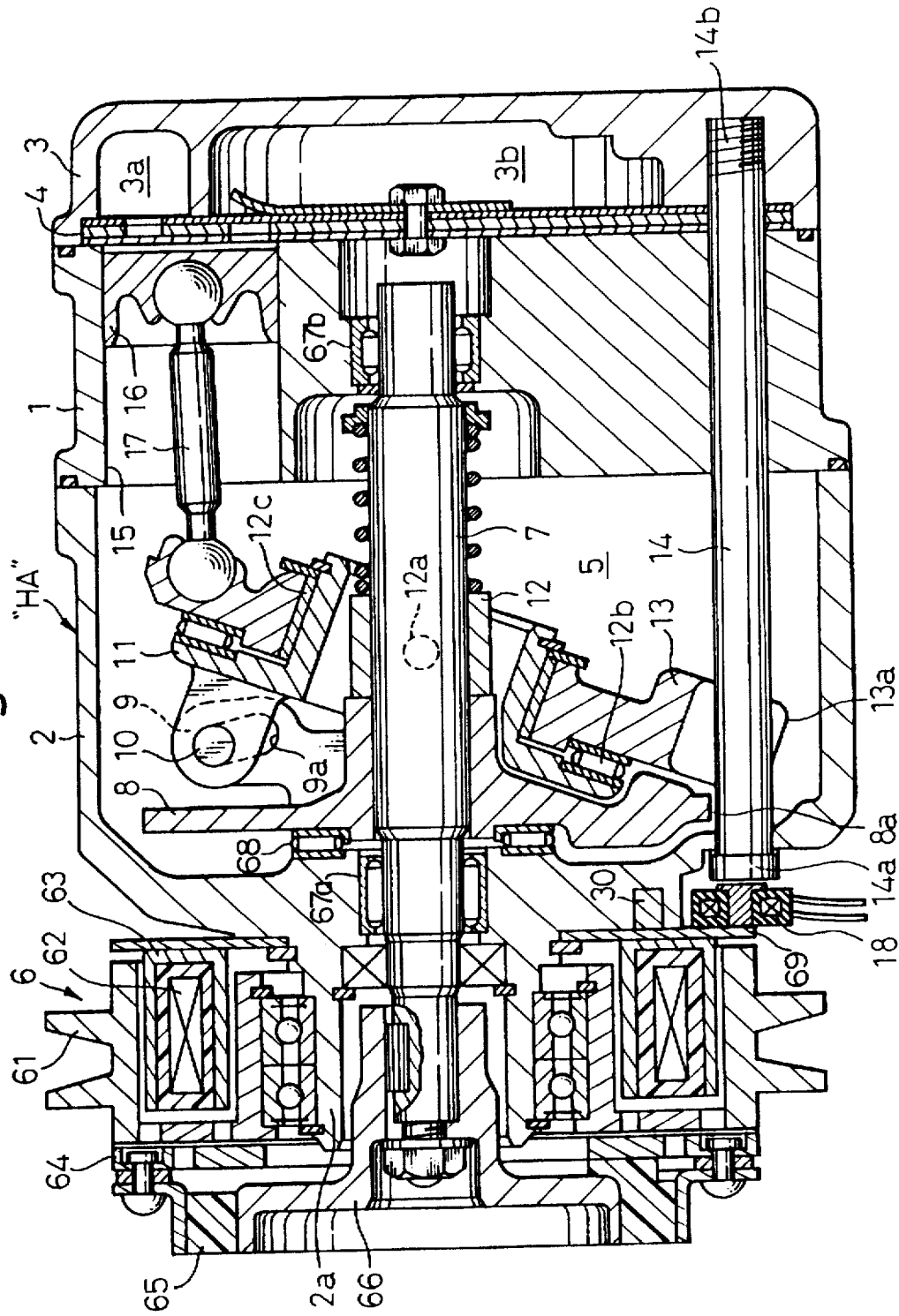
FIG. 2 is a longitudinal cross-sectional view of a refrigerant compressor provided with a rotation detecting means according to a second embodiment of the present invention.

FIG. 2 illustrates a similar wobble plate type refrigerant compressor provided with a rotation detecting means according to the second embodiment.

The second embodiment is different from the first embodiment of FIG. 1 in that the magnetic detector 18 of the second embodiment is mounted on the stator 63 of the solenoid clutch 6 via an appropriate bracket member 69 instead of being mounted on the head 14a of the long bolt 14. Nevertheless, the principle of operation of the magnetic detector 18 of the second embodiment is quite similar to that of the detector of the afore-mentioned first embodiment, namely, the detection of the rotating speed of the compressor is performed by detecting a change in the magnetic flux leaking from the solenoid 62 of the stator 63 of the solenoid clutch 6.

At this stage, if a large space is left between the head of the long bolt 14 forming a magnetic circuit, and the stator 63 of the solenoid clutch 6, it is desirable to adjustably increase the height of the head 14a of the long bolt 14, so that the outer end of the head 14a of the long bolt 14 approaches the stator 63 of the solenoid clutch 6 to thereby reduce the space between the head 14a of the long bolt 14 and the stator 63. Then, the magnetic circuit formed by the drive shaft 7, the rotor element 8, and the long bolt 14 for the magnetic flux leaking from the stator 63 of the solenoid clutch 6 can have a high magnetic conductivity, and accordingly, a large output signal can be obtained from the magnetic detector 18 of the second embodiment.

Alternatively, an appropriate supplementary plate member or the like may be additionally provided for increasing the magnetic conductivity of the magnetic circuit for the magnetic flux leaking from the solenoid of the solenoid clutch 6.

Figure 6:
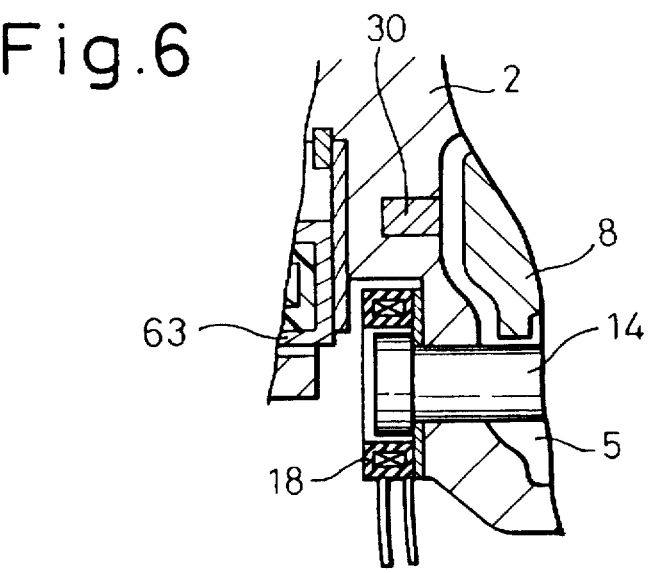
FIG. 6 is a partial cross-sectional view illustrating a permanent magnet mounted in the housing assembly of the compressor in a manner different from the permanent magnet of FIGS. 1 and 2.
Figure 7:
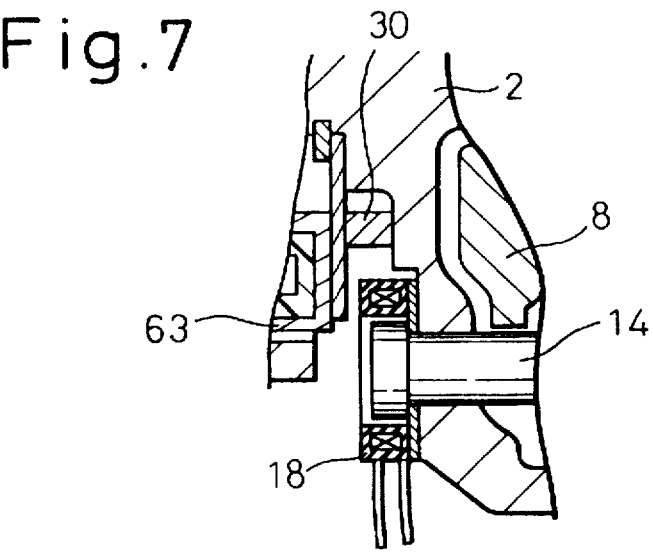
FIG. 7 is a partial cross-sectional view illustrating a permanent magnet mounted in a region outside the housing of the compressor.

FIGS. 6 and 7 illustrate different embodiments of the mounting method of the permanent magnet 30. The permanent magnet 30 of FIG. 6 is embedded in the front face of the front housing 2 from the interior of the crank chamber 5. Of course, the permanent magnet 30 is arranged adjacent to the rotor element 8 so that the magnetic flux generated by the permanent magnet 30 is able to increase the density of magnetic flux circulating through the magnetic circuit of the rotation detecting means of the present invention.

The permanent magnet 30 of FIG. 7 is arranged so as to be fixedly attached to the outer surface of the front face of the front housing 2. The operation of the permanent magnet 30 of FIG. 7 is the same as that of the permanent magnet 30 of the first and second embodiments.

From the foregoing description of the embodiments of the present invention, it will be understood that according to the present invention, the detection of the rotating speed of the compressor can be accurate and precise due to provision of a piece of permanent magnet for increasing the density of the magnetic flux leaking from the stator of the solenoid clutch and circulating through the magnetic circuit of the magnetic detector. Namely, a change in the magnetic flux during the rotation of the rotor element of the compressing mechanism can be sharp, and accordingly, the magnetic detector can surely detect the change in the magnetic flux to produce a large output signal indicating the rotating speed of the compressor.

Further, in the rotation detecting means for the compressor according to the present invention, an arrangement of the permanent magnet is simple and easy, and accordingly, manufacture of the compressor provided with the rotation detecting means is easy.

What we claim is:

1. A refrigerant compressor comprising:

a housing assembly formed by a plurality of framework members combined together;

a mechanical combining means for mechanically combining said plurality of framework members in a fluid-tight condition;

a drive shaft rotatably supported in said housing assembly and having a drive portion thereof within said housing assembly, and an axial extension outwardly extending from said drive portion thereof so as to receive a drive power from an external drive source via a solenoid clutch having a stator element containing a solenoid;

a compressing means mounted on said drive portion of said drive shaft within said housing assembly for performing a repetitive motion upon being driven by said drive shaft to compress a refrigerant gas; and a rotation detecting means which comprises in combination:

a magnetic circuit means for permitting magnetic flux leaking from said solenoid clutch to circulatively flow through said drive shaft, said compressing means, and said mechanical combining means;

a magnetic detecting means arranged in said magnetic circuit means in a region outside said housing assembly for detecting a change in the magnetic flux which occurs in response to the repetitive motion of said compressing means to thereby produce an output signal representing a rotating speed of said compressor; and a permanent magnet means fixedly arranged in one of said plurality of framework members at a position close to said magnetic detecting means and where said permanent magnet means confronts said compressing means, said permanent magnet means being arranged to generate an additional magnetic flux increasing the density of the magnetic flux circulating through said magnetic circuit means at a position close to said magnetic detecting means to thereby activate the detecting operation of said magnetic detecting means.

2. A refrigerant compressor according to claim 1, wherein said mechanical combining means comprises a plurality of long bolts, each having a head at one end thereof and a threaded portion at the other end thereof, said threaded portion of each of said plurality of long bolts being threadedly engaged with one of said plurality of framework members to tighten said housing assembly between said head and said threaded portion, said head of one of said plurality of long bolts being provided for mounting therearound said magnetic detecting means.

3. A refrigerant compressor according to claim 1, wherein said magnetic detecting means is attached to said stator element of said solenoid clutch.

4. A refrigerant compressor according to claim 1, wherein said permanent magnet means fixedly held by said housing assembly generates said additional magnetic flux so that said additional magnetic flux circulates through said compressing means, and said mechanical combining means.

5. A refrigerant compressor according to claim 4, wherein said permanent magnet means is embedded in said one of said framework members of said housing assembly.

6. A refrigerant compressor according to claim 4, wherein said permanent magnet means is fixedly attached to an outer surface of said one of said framework members of said housing assembly.

7. A refrigerant compressor according to claim 1, wherein said compressing means comprise a rotor element fixedly mounted on said drive portion of said drive shaft to be rotated together with said drive shaft.

8. A refrigerant compressor according to claim 7, wherein said rotor element comprises a generally round disc member having a circumference thereof provided with an intended cutout portion formed therein to cause a sharp change in the magnetic flux in said magnetic circuit means.

9. A refrigerant compressor according to claim 7, wherein said housing assembly is made of non-magnetic material, and wherein said drive shaft, said rotor element and said mechanical combining means are made of a magnetic material selected from an iron system metallic material.

* * * * *